W. B. & H. C. ATKINSON.
Evaporating-Pan.

No. 198,066. Patented Dec. 11, 1877.

WITNESSES:
C. Neveux
J. H. Scarborough

INVENTORS
W. B. Atkinson.
H. C. Atkinson.
BY
Munn & Co.
ATTORNEYS.

UNITED STATES PATENT OFFICE.

WILLIAM B. ATKINSON AND HENRY C. ATKINSON, OF FRANKLIN, KY.

IMPROVEMENT IN EVAPORATING-PANS.

Specification forming part of Letters Patent No. 198,066, dated December 11, 1877; application filed July 13, 1877.

*To all whom it may concern:*

Be it known that we, WILLIAM B. ATKINSON and HENRY C. ATKINSON, of Franklin, in the county of Simpson and State of Kentucky, have invented a new and useful Improvement in Evaporating-Pans, of which the following is a specification:

The object of this invention is to construct a cheap and serviceable evaporating-pan, capable of being repaired easily when a part of its bottom becomes burned.

Figure 1:
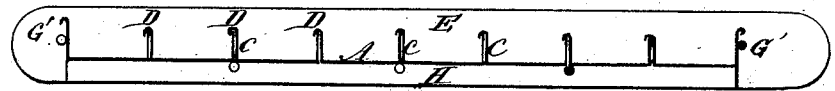
Figure 2:
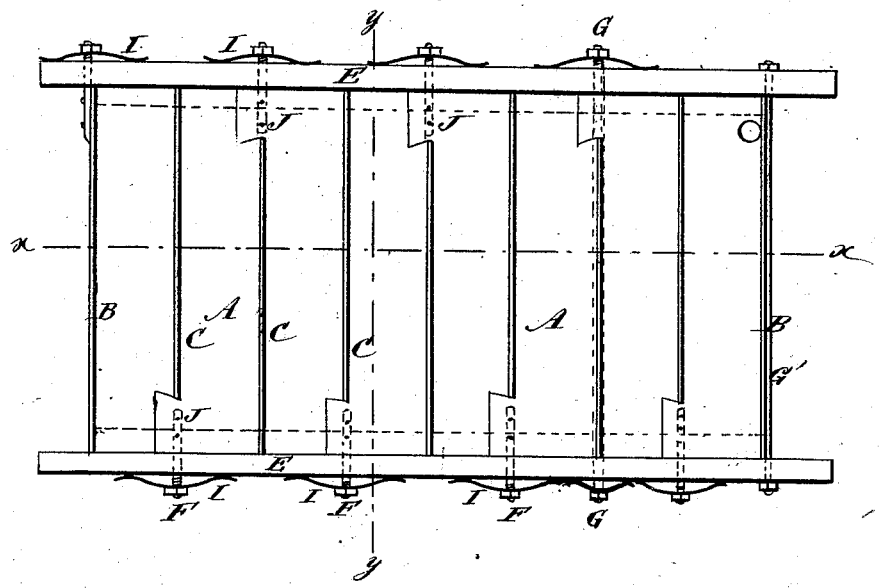
Figure 3:
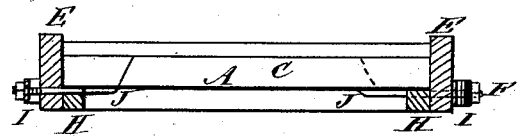

Figure 1 represents a longitudinal section through the line $x\ x$. Fig. 2 is a plan of the same. Fig. 3 is a cross-section through the line $y\ y$.

Similar letters of reference indicate corresponding parts.

In the case here presented the metal portion forming the bottom A, ends B B, and divisions C C C is made in sections of equal lengths. The said sections extend the full width of the pan, as shown in Figs. 2 and 3. Each section is locked, one to the other, by having their alternate divisions overlapping each other, as shown at D in Fig. 1. The sides E of the said evaporator are of wood, and are drawn tightly against the ends of the aforesaid sections by means of the nuts F on the rods G G, which extend across the under side of the pan through the supporting-strip H H, and through the sides E E, and terminating outside the arch-springs I I, against which the heads and nuts F have their bearings. The rods G' G' on the outer ends of the pan extend through the sides E E about on a level with the tops of the divisions C.

We also propose, instead of having the rods G G extend across the pan, as above described, to have them made in short lengths, and riveted to the bottom of the pan, as shown at J.

It will thus be seen that as one or more sections of the bottom may become burned or worn out, they may be replaced at a trifling expense.

The strips H serve to support the sections, and are held by the rods G, while the contraction and expansion of the metal are taken up by the arch-springs, all the parts being thus secured detachably, but firmly, together.

What we claim is—

In combination with the sections of an evaporating-pan, the sides E, supports H, rods G', nuts F, and springs I, substantially as shown and described.

WILLIAM BROWNLOW ATKINSON.
HENRY CATE ATKINSON.

Witnesses:
J. W. WHITESIDE,
I. V. BOGAN.